(12) United States Patent
Leen et al.

(10) Patent No.: US 7,104,066 B2
(45) Date of Patent: Sep. 12, 2006

(54) COMBUSTER SWIRLER ASSEMBLY

(75) Inventors: Thomas Anthony Leen, Cincinnati, OH (US); Marwan Al-Roub, Hamilton, OH (US); John Robert Staker, Cincinnati, OH (US)

(73) Assignee: General Electric Company, Schenectady, NY (US)

( * ) Notice: Subject to any disclaimer, the term of this patent is extended or adjusted under 35 U.S.C. 154(b) by 630 days.

(21) Appl. No.: 10/604,809

(22) Filed: Aug. 19, 2003

(65) Prior Publication Data

US 2005/0039458 A1 Feb. 24, 2005

(51) Int. Cl.
*F01C 1/00* (2006.01)
(52) U.S. Cl. .......................... 60/740; 60/748
(58) Field of Classification Search ............... 60/740, 60/748
See application file for complete search history.

(56) References Cited

U.S. PATENT DOCUMENTS

| | | | |
|---|---|---|---|
| 5,117,624 A | 6/1992 | Roberts, Jr. et al. | |
| 5,117,637 A | 6/1992 | Howell et al. | |
| 5,237,820 A | 8/1993 | Kastl et al. | |
| 5,307,637 A | 5/1994 | Stickles et al. | |
| 5,490,378 A * | 2/1996 | Berger et al. | 60/39.23 |
| 5,916,142 A | 6/1999 | Snyder et al. | |
| 5,941,075 A * | 8/1999 | Ansart et al. | 60/748 |
| 6,282,886 B1 | 9/2001 | Sato et al. | |
| 6,314,739 B1 | 11/2001 | Howell et al. | |
| 6,327,861 B1 | 12/2001 | Sato et al. | |
| 6,427,435 B1 | 8/2002 | Patterson et al. | |
| 6,442,940 B1 | 9/2002 | Young et al. | |
| 6,453,671 B1 | 9/2002 | Leen et al. | |

FOREIGN PATENT DOCUMENTS

| | | |
|---|---|---|
| EP | 1 116 918 A1 | 7/2001 |
| EP | 1 158 246 A2 | 11/2001 |

\* cited by examiner

*Primary Examiner*—Charles G. Freay
(74) *Attorney, Agent, or Firm*—William Scott Andes; Daniel F. Nesbitt; Hasse & Nesbitt LLC

(57) ABSTRACT

A unitary swirler assembly that provides improved service life, having a ferrule body and a unitary swirler body. The unitary swirler body has oppositely-directed primary swirler passages and secondary swirler passages. A pair of rails formed on the unitary swirler body engage the ferrule body to limit relative movement, and prevent relative rotation, of the ferrule body and the unitary swirler body.

10 Claims, 4 Drawing Sheets

COMBUSTER SWIRLER ASSEMBLY

BACKGROUND OF INVENTION

The invention relates to swirler assemblies for supplying compressed air to the combustor of gas turbine engines.

A gas turbine engine includes a compressor that provides pressurized air to a combustor wherein the air is mixed with fuel and ignited for generating hot combustion gases. These gases flow downstream to one or more turbines that extract energy therefrom to power the compressor and provide useful work such as powering an aircraft in flight. In combustors used with aircraft engines, the fuel is typically supplied to the combustor through a plurality of fuel nozzles positioned at one end of the combustion zone. The air is supplied through surrounding assemblies, known as swirler assemblies, which impart a swirling motion to the air so as to cause the air and fuel to be thoroughly mixed. The swirler assemblies are mounted in a dome plate that is joined to the upstream ends of the combustor's inner and outer liners, and each fuel nozzle tip is received in a corresponding one of the swirler assemblies.

One conventional swirler assembly is a three part assembly comprising a primary swirler, a secondary swirler and a retainer. The primary swirler has a plurality of circumferentially spaced swirl vanes or air passages. The vanes or passages are angled with respect to the axial centerline of the swirler assembly so as to impart a swirling motion to the air flow. The secondary swirler, also having a plurality of circumferentially spaced swirl vanes or air passages, is disposed immediately downstream of the primary swirler. The vanes or passages of the secondary swirler are angled so as to produce a swirl of air swirling in the opposite direction as the primary swirler to further promote fuel-air mixing. The retainer fits over the primary swirler and is welded to the secondary swirler to retain the two swirlers in engagement with one another.

The air flow through the vanes or passages of the primary swirler creates a reaction force that tends to cause the primary swirler to rotate with respect to the secondary swirler and the fuel nozzle. However, if allowed to rotate, the primary swirler would fail to impart the necessary level of swirling to the air, and effective mixing of the air and fuel would not be achieved. Furthermore, rotation of the primary swirler would cause excessive wear to the fuel nozzle tip. Primary swirler rotation is thus prevented in conventional swirler assemblies by providing an outwardly extending tab on the primary swirler and a post on the secondary swirler, wherein the tab engages the post so as to limit relative rotation of the swirlers.

However, the combustor structure is vibrationally active and there is substantial thermal expansion of components during operation of a gas turbine engine. As a result, there is relative movement between the tab and the post resulting in significant wear that eventually requires repair and increases maintenance costs. The repair process is relatively difficult because it requires removal of the permanently welded retainer. It is also possible that a worn tab and/or post could break off and cause damage to the turbine downstream. Furthermore, the retainer is susceptible to cracking during operation and often needs to be replaced.

Accordingly, there is a need for an improved swirler assembly that can prevent and preferably prevent rotation of the primary swirler relative to the secondary swirler, to eliminate frequent repairs, and which is easy to field assemble and disassemble.

SUMMARY OF INVENTION

The present invention provides a swirler assembly comprising: a ferrule body comprising 1) a substantially square base having an upper surface and a lower surface, having opposed first and second side edges, and having a centrally-positioned opening formed therein, 2) a ferrule extending from the upper surface and the central opening, and 3) a plurality of protrusions along the upper surface of each side edge; and a unitary swirler body comprising 1) a first swirl section having a plurality of angularly directed passages, 2) a second swirl section comprising a venturi and a plurality of oppositely-angled, directed passages disposed coaxially around the venturi, and 3) a pair of rails, each comprising an inwardly-extending flange, each formed on opposite sides of the venturi, wherein the rails engage the protrusions along the opposite sides edges of the ferrule body to limit separation of ferrule body and the unitary swirler body.

BRIEF DESCRIPTION OF DRAWINGS

The subject matter which is regarded as the invention is particularly pointed out and distinctly claimed in the concluding part of the specification. The invention, however, can be best understood by reference to the following description taken in conjunction with the accompanying drawing figures wherein identical reference numerals denote the same elements throughout the various views.

DETAILED DESCRIPTION

Figure 1:
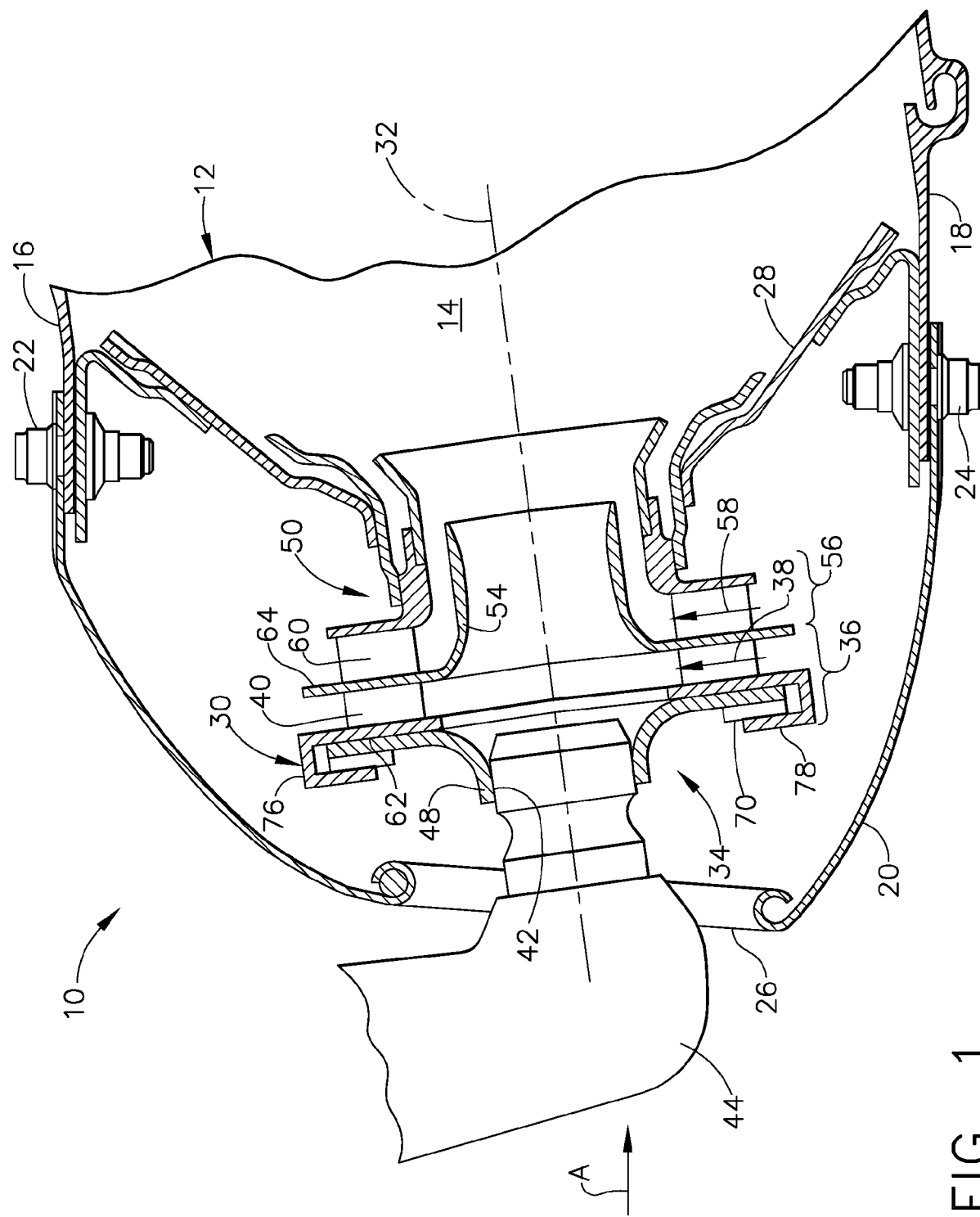
FIG. 1 is an axial sectional view of the forward portion of combustor having a swirler assembly of the present invention.

Referring to the drawings, FIG. 1 shows the forward end of a combustor 10 of the type suitable for use in a gas turbine engine and including a hollow body 12 defining a combustion chamber 14 therein. The hollow body 12 is generally annular in form and is defined by an outer liner 16 and an inner liner 18. The upstream end of the hollow body 12 is substantially closed off by a cowl 20 attached to the outer liner 16 by a first fastener 22 and to the inner liner 18 by a second fastener 24. At least one opening 26 is formed in the cowl 20 for the introduction of fuel and compressed air. The compressed air is introduced into the combustor 10 from a compressor (not shown) in a direction generally indicated by arrow A of FIG. 1. The compressed air passes primarily through the opening 26 to support combustion and partially into the region surrounding the hollow body 12 where it is used to cool both the liners 16, 18 and turbomachinery further downstream.

Disposed between and interconnecting the outer and inner liners 16, 18 near their upstream ends is an annular dome plate 28. A plurality of circumferentially spaced swirler assemblies 30 (one shown in FIG. 1) is mounted in the dome plate 28. Each swirler assembly 30 includes a ferrule body 34 having a ferrule 48 with a central opening 42 that coaxially receives a fuel nozzle 44, and a unitary swirler body 50. The unitary swirler body is fixedly received in the dome plate 28.

The unitary swirler body 50 comprises a first swirler section 36 having a plurality of circumferentially spaced primary swirl vanes 40 defining a plurality of angularly directed primary passages 38. The primary passages 38 are angled with respect to the axial centerline 32 of the swirler assembly 30 so as to impart a swirling motion to the air flow in a first direction tangential to the centerline 32. The unitary swirler body 50 further comprises a second swirler section 56 having a venturi 54 and a plurality of circumferentially spaced swirl vanes 60 defining a plurality of oppositely-angled and directed secondary passages 58 disposed coaxially about the venturi 54. The primary swirler section 36 and secondary swirler section 56 are rigidly connected, through the intermediate partition 64, into a unitary body, to eliminate movement between the two sections. The venturi 54 and the central opening 42 of the ferrule 48 are both coaxially aligned with the axial centerline 32 of the swirler assembly 30.

A portion of air from the opening 26 passes into and through the primary passages 38. The swirling air exiting the primary passages 38 interacts with fuel injected from the fuel nozzle 44, and mixes with the fuel as they pass into and through the venturi 54. The secondary passages 58 direct another portion of air from the opening 26 to swirl in an opposite tangential direction relative to the centerline 32, which air interacts with the fuel/air mixture leaving the venturi 54, to further atomize the fuel/air mixture and prepare the mixture for combustion in the combustion chamber 14.

It should be noted that although FIG. 1 illustrates the swirler assembly of the present invention in a single annular combustor, the present invention is equally applicable to other types of combustors, including multi-annular combustors.

Figure 2:
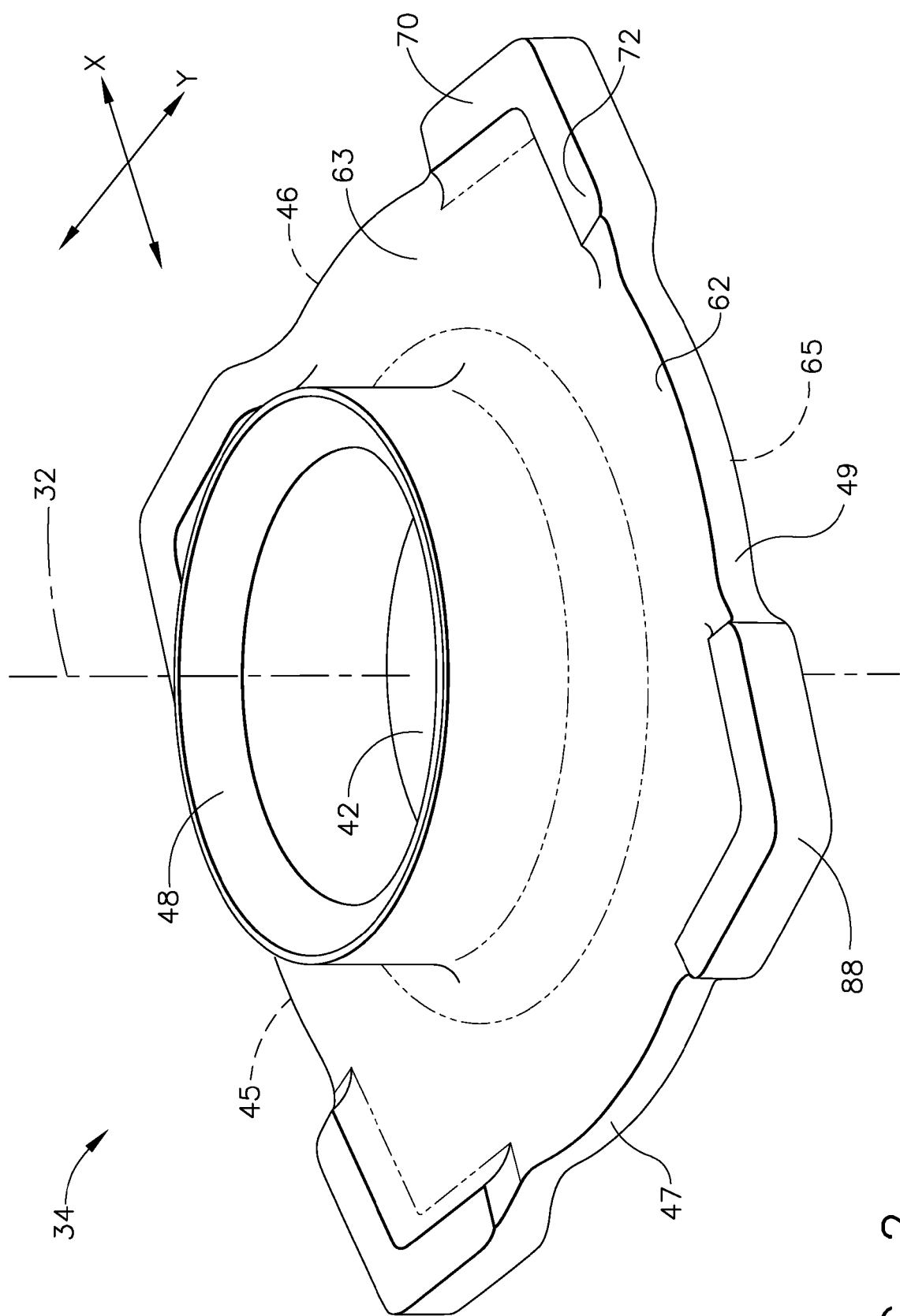
FIG. 2 is a perspective view of a ferrule body for the swirler assembly of the present invention.

In FIG. 2, the ferrule body 34 has a base 62, shown as a flat member having an upper surface 63 and a lower surface 65, defining a perimeter and outer side edges, including opposed side edges 46 and 47. The ferrule body 34 also comprises a ferrule 48 formed on the upper surface 63 of the base 62 and having a central opening 42. The base 62 is typically substantially square in shape, with the ferrule 48 centered. The ferrule body 34 is typically substantially symmetrical relative to a plane passing through a centerline 32 of the ferrule 48, and through either a first axis X or a second axis Y. The first surface of the base 62, from which the ferrule 48 extends, faces upstream when the swirler assembly 30 is properly positioned in the combustor 10. A plurality of raised protrusions 70 occupy a portion of the outer side edges along the periphery of the base 62, and typically are formed on the upper surface 63 of the base 62, along the opposite side edges 46 and 47 of the ferrule 48. More typically, the protrusions 70 are formed on a portion of each side edge 45, 46, 47 and 49, in substantially the same pattern and arrangement. The embodiment in FIG. 2 shows the protrusion 70 positioned at each corner 88 of the base 62, and extending from each corner inwardly for a portion of the length of the each side edge.

Figure 3:
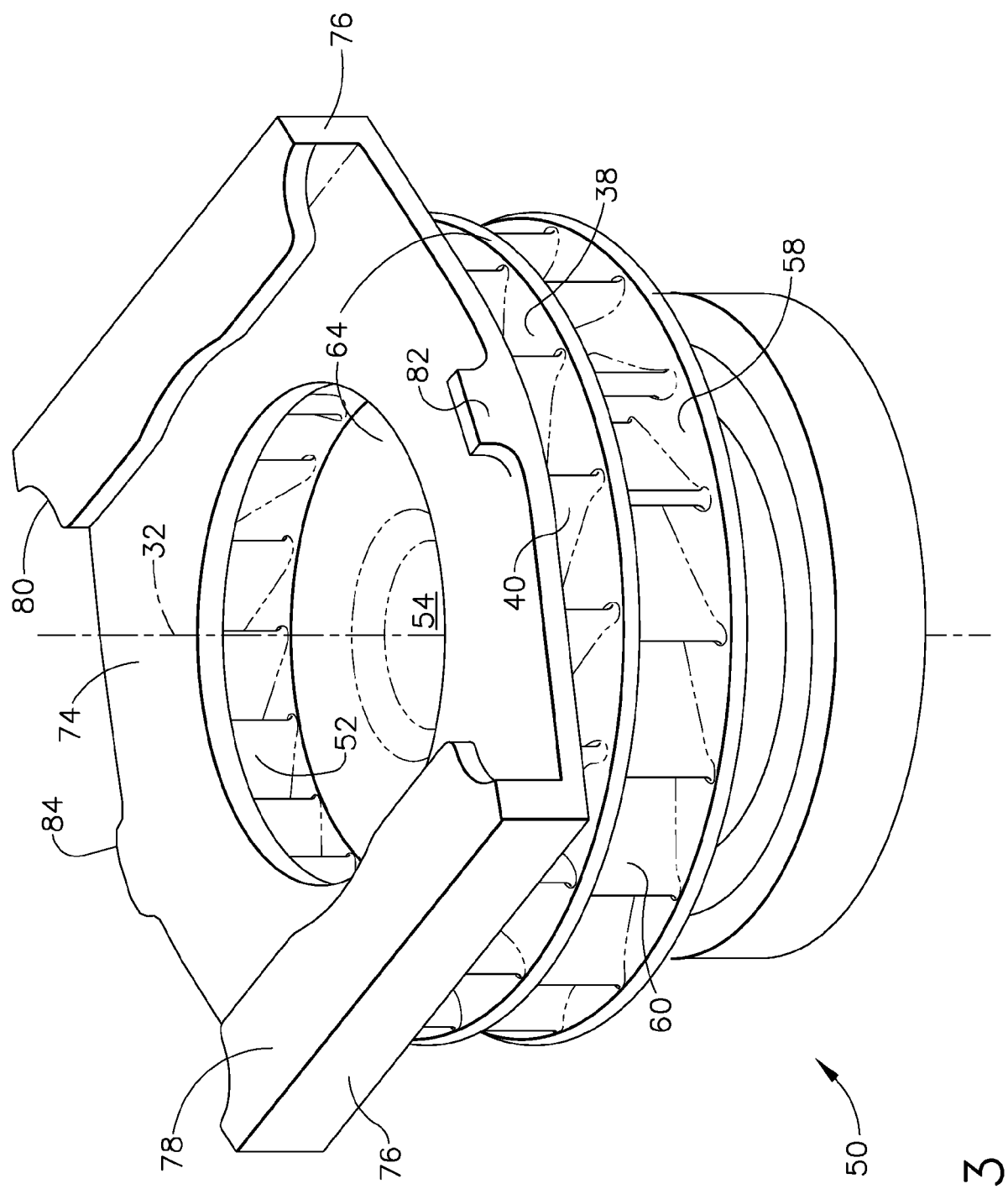
FIG. 3 is a perspective view of a unitary swirler body for the swirler assembly of the present invention.

In FIG. 3, the first swirler section 36 comprises a base 74, which is also a flat member defining a perimeter or outer edge around a central opening 52. The base 74 has an upstream surface, which confronts the lower surface 65 of the ferrule body 34 (shown in FIG. 2) when the swirler assembly 30 is assembled. A plurality of primary swirl vanes 40 define the plurality of primary passages 38 disposed circumferentially about the opening 52. The swirler vanes 40 join together the down stream surface of the base 74 and an intermediate partition 64. The intermediate partition 64 has a central opening defined by an inner edge that forms a venturi 54. The venturi 54 extends axially (with respect to the axial centerline 32 of the swirler assembly 30) downstream from the inner edge of the intermediate partition 64. A second swirler section 56 of the unitary swirler body 50 comprises secondary passages 58 defined by a plurality of circumferentially spaced secondary swirl vanes 60 disposed coaxially about the venturi 54.

A pair of retainer rails 76 extends axially outward from the upstream surface of the base 74. Each retainer rail 76 is located along the outer edge of the base 74, on opposite sides of the opening 52 so as to be arranged substantially parallel to one another. Each retainer rail 76 includes an inwardly-directed (that is, toward the axial centerline 32 of the swirler assembly 30) flange 78 thereon, for engaging the upper surface 72 of the protrusions 70 of the base 62 the ferrule body 34. The spacing of the flange 78 from the upper surface of the base 74 is sufficient to provide clearance for the ferrule body 34 to slide into position. The symmetry of the ferrule body 34, relative to a plane passing through a centerline 32 of the ferrule 48, and through either a first axis X or a second axis Y, shown in FIG. 4, permits the ferrule body 34 to be inserted correctly into the unitary swirler body 50, regardless of its orientation.

The unitary swirler body 50 further includes a stop tab 82 formed on the outer edge of the base 74 and extending axially outward from the first surface thereof. The stop tab is configured to confine the ferrule body 34 in assembled position with the unitary swirler body 50. The stop tab 82 is shown as a planar surface located on the outer edge of the base 74 that extends perpendicularly to the retainer rails 76. A weld tab 84 is also formed on the outer edge of the base 74 but extends substantially radially outwardly therefrom. Typically the weld tab 84 is in the same plane as the base 74 of the unitary swirler body 50, to permit the base 62 of the ferrule body 34 to slide under the rails 72 and into confronting position with the base 74. The weld tab 84 is located on an opposite side of the venturi 54 from the stop tab 82, and is configured to cooperate with a tack weld 86 (shown in FIG. 4) to confine the ferrule body 34 in assembled position with the unitary swirler body 50.

Figure 4:
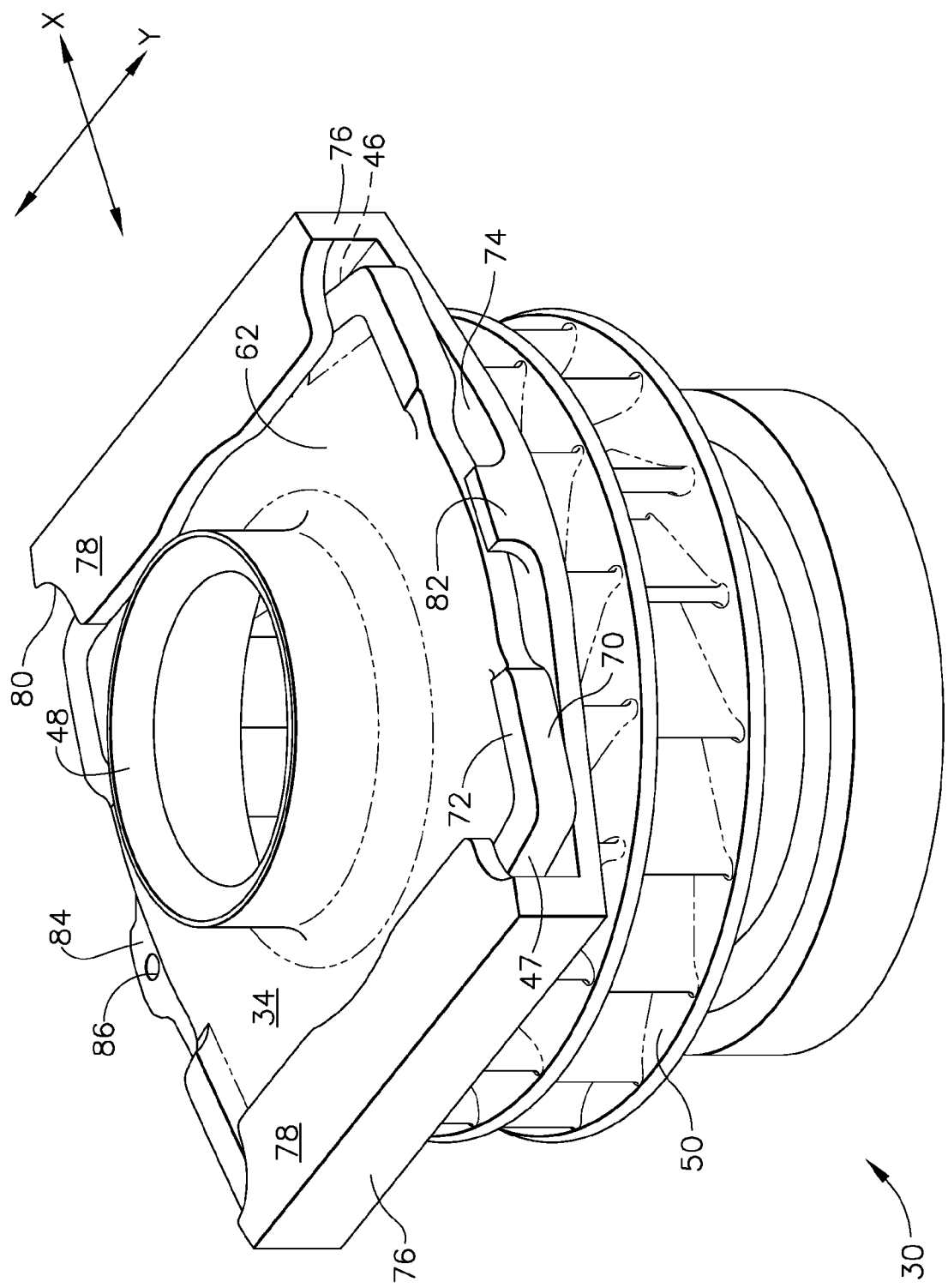
FIG. 4 is a perspective view of an assembled swirler assembly of the present invention.

The bases 62 and 74 of the ferrule body 34 and unitary swirler body 50, respectively, have substantially the same shape, although the base 74 of the unitary swirler body 50 is slightly larger. As shown in FIG. 4, the swirler assembly 30 is assembled by sliding the ferrule body 34 into engagement with the unitary swirler body 50 such that the bases 62 and 74 confront one another in a substantially coplanar manner. Furthermore, the retainer rails can be configured to confront sufficiently the opposing side edges 46, 47 of the base 62 the ferrule body 34 to prevent rotation of the ferrule body 34 relative to the unitary swirler body 50. The upper surfaces 72 of the protrusions 70 along the side edges 46, 47 are also engaged by the retainer rail flanges 78 so as to axially hold the ferrule body 34 and unitary swirler body 50 together. The retainer rails 76 also limit lateral movement of the ferrule body 34 with respect to the unitary swirler body 50 along a first axis, denoted as axis X in FIG. 4, which lies in the plane defined by the bases 62 and 74. That is, the two retainer rails 76 are spaced apart sufficiently in the X direction to allow limited lateral movement of the ferrule body 34 relative to the unitary swirler body 50. Similarly, the stop tab 82 and a tack weld 86, which is applied to the weld tab 84 after assembly of the ferrule body 34 and unitary swirler body 50, operate to limit lateral movement of the ferrule body 34 along a second axis, denoted as axis Y in FIG. 4, which also lies in the plane defined by the bases 62 and 74, perpendicular to axis X. In this case, the stop tab 82 and the tack weld 86 are spaced apart sufficiently in the Y direction to permit limited lateral movement of the ferrule body 34 relative to the unitary swirler body 50. This arrangement allows the ferrule body 34 to float or move laterally so that the ferrule 48 can be coaxially aligned with, and receive, the fuel nozzle 44, but otherwise prevents the ferrule body 34 and unitary swirler body 50 from becoming disengaged while the swirler assembly 30 is being installed in the combustor 10.

The flanges 78 are provided with scalloped ends, as described in U.S. Pat. No. 6,427,435, incorporated herein by reference. As shown in FIG. 3, the ends of the flange 78 are formed as a cutout 80, which reduces the weld joint and bending stresses that occur from the forced vibration of the cantilevered flanges 78. The curved cutouts 80 also reduce the stress concentration factor at the corners of the flanges, which is where most cracks initiate in conventional retainer segments.

Once the swirler assembly 30 is installed in the combustor 10, the fuel nozzle 44 centers and holds the ferrule body 34 in place between the two retainer rails 76. Thus, the retainer rail flanges 78, the stop tab 82 and the tack weld 86 typically provide no further function when the swirler assembly 30 is installed in the combustor 10. Furthermore, air flow from the compressor during engine operation holds the ferrule body 34 against the unitary swirler body 50.

The two part assembly of the present invention reduces costs and facilitates manufacture since the fixturing and set-up for welding a separate retainer for the ferrule to the swirler is eliminated. Repair of the swirler assembly is easier because removing the ferrule body 34 during field repair simply requires removal of the small tack weld 86 rather than removing a permanently-welded retainer as before. The protrusions 70 provide significant less contact area with the flanges 78 of the retainer rails 76, which limits the location where wear will occur to the protrusions 70 only, thus allowing better control of the location of the wear and of repair. The reduced contact area of the upper surfaces 72 of the protrusions 70 also significantly reduce frictional forces between the ferrule body 34 and the rails 76 and flanges 78 of the unitary swirler body 50, and improves the ease of movement of the ferrule body 34 within the assembly during operation of the engine.

While specific embodiments of the present invention have been described, it will be apparent to those skilled in the art that various modifications thereto can be made without departing from the spirit and scope of the invention as defined in the appended claims.

We claim:

1. A swirler assembly comprising:
   a ferrule body comprising
   1) a substantially square base having an upper surface and a lower surface, having opposed first and second side edges, and having a centrally-positioned opening formed therein,
   2) a ferrule extending from the upper surface and the central opening, and
   3) a plurality of protrusions along the upper surface of each side edge, and
   a unitary swirler body comprising:
   1) a first swirl section having a plurality of angularly directed passages,
   2) a second swirl section comprising a venturi and a plurality of oppositely-angled, directed passages disposed coaxially around the venturi, and
   3) a pair of rails, each comprising an inwardly-extending flange, each formed on opposite sides of the venturi, wherein the rails engage the protrusions along the opposite sides edges of the ferrule body to limit separation of ferrule body and the unitary swirler body.

2. The swirler assembly of claim 1 further comprising a stop tab formed on the unitary swirler body.

3. The swirler assembly of claim 2 wherein the stop tab is formed on an outer edge of the unitary swirler body.

4. The swirler assembly of claim 3 wherein the stop tab defines a planar surface that is perpendicular to the rail.

5. The swirler assembly of claim 3 further comprising a tack weld applied to the unitary swirler body, the tack weld being spaced from the stop tab so as to permit limited lateral movement of the ferrule body relative to the unitary swirler body.

6. The swirler assembly of claim 5 further comprising a weld tab formed on the unitary swirler body, wherein the tack weld is applied to the weld tab.

7. The swirler assembly of claim 1 wherein the pair of rails are parallel to one another.

8. The swirler assembly of claim 1 wherein the pair of rails are spaced apart so as to permit limited lateral movement of the ferrule body relative to the unitary swirler body.

9. The swirler assembly of claim 1 wherein the ferrule body is substantially symmetrical relative to a plane passing through a center line of the ferrule and through either a first axis X or a second axis Y.

10. A swirler assembly comprising:
    a ferrule body comprising
    1) a substantially square base having an upper surface and a lower surface, having opposed first and second side edges, and having a centrally-positioned opening formed therein,
    2) a ferrule extending from the upper surface and the central opening, and
    3) a plurality of protrusions along the upper surface of each side edge, and
    a unitary swirler body comprising:
    1) a first swirl section having a plurality of angularly directed passages,
    2) a second swirl section comprising a venturi and a plurality of oppositely-angled, directed passages disposed coaxially around the venturi,
    3) a pair of rails, parallel to one another, each comprising an inwardly-extending flange, each formed on opposite sides of the venturi,
    4) a stop tab, comprising a planar surface that is perpendicular to the rails, and
    5) a weld tab, comprising a tack weld applied thereon, wherein the tack weld and the stop tab are spaced apart, and the pair of rails are spaced apart, so as to permit limited lateral movement of the ferrule body relative to the unitary swirler body, and wherein the rails engage the protrusions along the opposite side edges of the ferrule body to limit separation of ferrule body and the unitary swirler body.

* * * * *